United States Patent
Brown et al.

[15] 3,701,424
[45] Oct. 31, 1972

[54] FLUID FILTERING DEVICE

[72] Inventors: Carl A. Brown, Birmingham; Jerald F. Thomas, Utica, both of Mich.

[73] Assignee: Parker-Hannifin Corporation, Cleveland, Ohio

[22] Filed: June 1, 1970

[21] Appl. No.: 42,029

[52] U.S. Cl. ..................... 210/90, 210/130, 210/223
[51] Int. Cl. ............................................. B01d 35/14
[58] Field of Search ............................... 210/90, 130

[56] References Cited

UNITED STATES PATENTS

| | | | |
|---|---|---|---|
| 3,314,541 | 4/1967 | Rosaen | 210/90 |
| 3,464,556 | 9/1969 | Cullen | 210/130 X |
| 3,291,307 | 12/1966 | Rosaen | 210/130 X |
| 3,342,332 | 9/1967 | Kudlaty | 210/130 X |

*Primary Examiner*—Samih N. Zaharna
*Attorney*—Hauke, Gifford and Patalidis

[57] ABSTRACT

A fluid filtering device having a housing with a cavity in which a cylindrical filter element is disposed defining an annular chamber between the outer wall of the filter element and the interior of the housing, the annular chamber registering with an inlet port of the device. One end of the filter element registers with an outlet port of the device such that the normal path of fluid flow is from the inlet port into the annular chamber, radially through the walls of the filter element, axially through the interior of the filter element and externally of the filtering device via the outlet port. When the filter element becomes clogged by a predetermined amount a valve mechanism disposed at the opposite end of the filter element causes the fluid to bypass the filter element. The valve mechanism is carried within a boss integrally formed with a cover member, which in turn closes the housing cavity and further includes means operatively connected to the valve mechanism for indicating the filtering condition of the filter element.

2 Claims, 3 Drawing Figures

PATENTED OCT 31 1972　　　　　　　　　　　　3,701,424

INVENTORS
CARL A. BROWN
GERALD F. THOMAS
BY

*Hauke Gifford & Patalidis*

-Attorneys-

FLUID FILTERING DEVICE

BACKGROUND OF THE INVENTION

I. Field of the Invention

This invention relates to fluid filtering devices and particularly to fluid filtering devices of the type having means for bypassing a filter element contained therein when the filter element becomes clogged by a predetermined amount.

II. Description of the Prior Art

Fluid filtering devices eventually become clogged and generally the filter element must be periodically removed from the device for cleaning or replacement. Many of the previously used devices have included a valve mechanism which causes fluid entering the filtering device to bypass the filter element when the element has become clogged beyond a predetermined amount. Such valve mechanism has normally included means mounted exteriorly of the device and operatively connected to the valve mechanism to indicate the degree that the valve is open and thus the degree of clogging of the filter element. To give an accurate indication the valving mechanism and indicating means must be accurately adjusted. Normally, the valve mechanism and indicating means are removed from the filter device with the filter element and therefore are subject to damage and readjustment each time the filter element is removed. If the valve mechanism is damaged or requires readjustment by reason of removal, the filtering device may not be used until it has been repaired, replaced or readjusted. This could represent a substantial financial loss since it results in machine down time. Further, the operator of the machine may not be aware of the fact that the indicating means and valve mechanism require readjustment and may reassemble the filtering device without the necessary readjustments so that during subsequent use the operator of the machine may not be aware that the filter element has become clogged and the fluid passing therethrough is not being filtered because of this malfunction.

In many of the previously used filtering devices the valve mechanism for bypassing the filter element is carried by the filter element and is movable therewith and generally such valve mechanism is of the pressure responsive type. Since the valve mechanism must carry the entire filter assembly with it when it is displaced to a bypassing condition, such pressure responsive valve mechanism is not as sensitive to the clogging of the filter element as is desired.

It would therefore be desirable to provide a fluid filter device having a valve mechanism and indicating means associated therewith which obviate the aforementioned problems by providing a relatively simple structure for supporting the valve mechanism and the indicating means carried thereby.

SUMMARY OF THE INVENTION

The present invention, which will be described subsequently in greater detail, comprises a fluid filtering device having a cavity in which a filter element is disposed for filtering fluid between an inlet and an outlet of the device. The fluid filtering device is further provided with a valve mechanism operable to cause the fluid within the device to bypass the filter element when the same becomes clogged beyond a certain predetermined amount. Indicating means mounted exteriorly of the housing and operatively connected to the bypass valve mechanism visually indicate to the operator of the machine the condition of the filter element. The filter element is provided with a cover member secured to the housing for closing the housing cavity, the removal of which permits access to the filter element for removal or replacement of the element after it has become clogged.

The cover member has a cylindrically shaped hollow boss member integrally formed therewith and extending into the cavity. An elongated guide member is centrally disposed within the boss and is rigidly attached at one end to the cover member and extends into the interior of the boss member. A pressure responsive piston member is slidably mounted on the elongated guide member, the periphery of the piston being in a fluid sealing relationship with the interior surface of the boss member dividing the same into two chambers, one of which has a fluid port registering with the inlet port of the fluid device, while the other chamber has a second port registering with the outlet port of the device. The piston member normally prevents fluid communication between the first and second ports when the filter element is operating in an unclogged mode. When the filter element is clogged to a certain degree, the pressure differential between the inlet and outlet ports of the filtering device is such that the pressure differential created thereby causes the piston member to move along the guide member to a position wherein the first and second ports of the boss are in fluid communication thereby causing fluid to bypass the filter element. A support plate carried at the inner end of the boss has means for rigidly attaching the opposite end of the guide member so that the same is rigidly mounted at both its ends within the boss member, thereby providing a rigid support for the piston member. The entire bypass valve mechanism and indicating means assembly is carried by the cover member and is removable from the housing of the device as a single unit.

It is therefore an object of the present invention to provide a fluid filtering device having a fluid bypass valve mechanism and indicating means therefore which do not require readjustment when the fluid filtering device is disassembled in order to remove the filter element contained therein; and which is more sensitive to the pressure changes within the fluid filtering device when the filter element becomes clogged.

Other objects, advantages, and applications of the present invention will become apparent to those skilled in the art of fluid filtering devices when the accompanying description of an example of the best mode contemplated for practicing the invention is read in conjunction with the accompanying drawing.

BRIEF DESCRIPTION OF THE DRAWING

The description herein makes reference to the accompanying drawing wherein like reference numerals refer to like parts and in which.

DESCRIPTION OF THE PREFERRED EMBODIMENT

Figure 1:
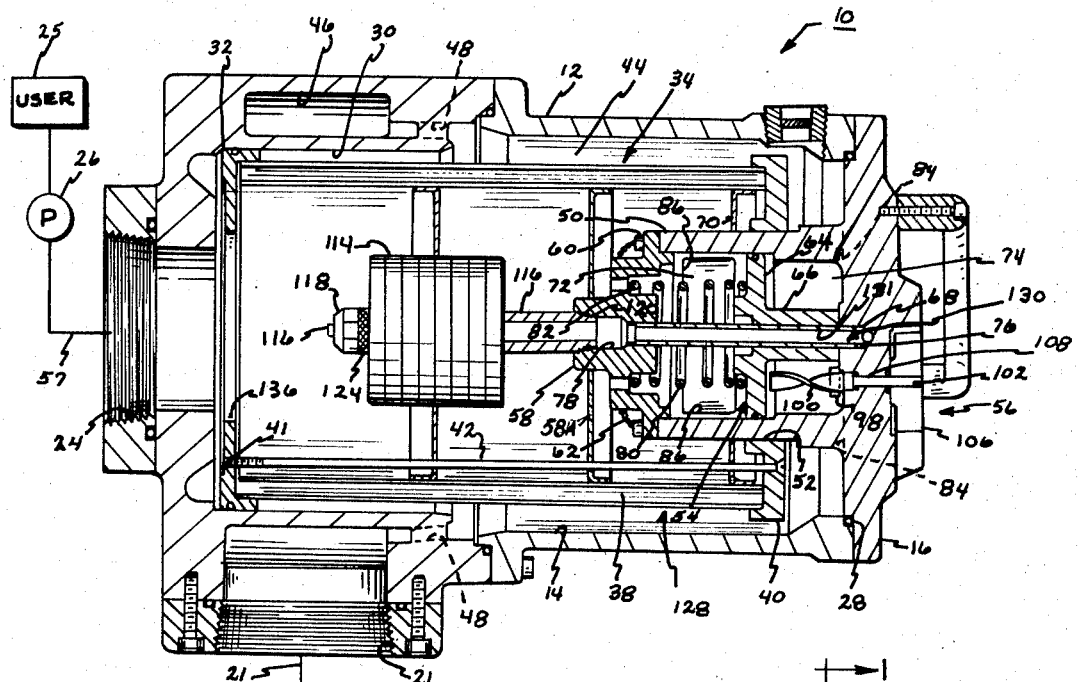
FIG. 1 is a longitudinal cross-sectional view of a fluid filtering device incorporating the present invention and taken substantially along line 1—1 of FIG. 2.

Referring now to the drawing and especially FIG. 1, there is illustrated a preferred embodiment of the present invention in the form of a fluid filtering device 10 comprising a housing 12 having a cavity 14 enclosed by a cover 16 secured to the housing 12 by any suitable means, such as screws, (not shown). The housing 12 is further provided with an inlet port 20 which is connected by any suitable conduit means 21 to a source of fluid, schematically indicated at 22, so as to direct fluid from the source 22 into the housing cavity 14. An outlet port 24 registers with the cavity 14 and is adapted to communicate fluid from the fluid filtering device 10 to a suitable fluid user by means of a pump, both of which are schematically illustrated at 25 and 26, respectively. Leakage past the cap 16 is prevented by an O-ring seal 28.

Inside the housing cavity 14 and coaxial with the outlet 14, the cavity wall is finished to provide a cylinder 30 adapted to receive a cooperating piston-like end cap 32 formed on one end of a filter cartridge 34. The piston-like cap 32 is in the form of an annulus, that is, it is provided with an opening 36 so that fluid may pass from inside the cartridge 34 therethrough on its way to the outlet 24. A cylindrical filter element 38 is carried between the piston-like cap 32 and a flange cap 40 with the filter element 38 and the caps 32 and 40 being suitably secured together in any desired fashion, such as by means of screws, one of which is shown at 42, passing through the flange cap 40 and threaded into piston-like cap 32 as shown at 41. The assembly of the filter element 38 and the two end caps 32 and 40 thus constitute the filter cartridge 34.

The interior of the housing 12 and the outer wall of the filter cartridge 34 define an annular space 44 which is in fluid communication with the inlet 20 by means of an annular core 46 and axial passageways 48 extending between the annular chamber 44 and the annular core 46.

The cover is provided with an axially inwardly extending boss portion 50 which is integrally formed on the inner surface of the cover 16, the free inner end of the boss portion 50 extending into the interior of the filter cartridge 34 through an aperture 52 formed in the flange cap 40. The clearance between the boss portion 50 and aperture 52 is such as to prevent the passage of fluid between the top portion of the annular chamber 44 and the interior of the filter cartridge 34. Mounted within the boss portion 50 is a bypass valve mechanism 54 and indicating means 56, both of which will be described in greater detail hereinafter.

During normal operation of the fluid filtering device 10, the fluid used in the system is drawn from the source 22 through the inlet 20 by means of suction created by the pump 26 in a conduit 57 which connects the pump 26 to the outlet 24. The fluid normally flows through the annular core 46, the axial passageways 48, into the annular chamber 44 and through the cylindrical filter element 38 in a radial direction to filter dirt and the like from the fluid. Fluid passing into the filter cartridge 34 flows in an axial direction through the opening 36 in the piston-like cap 32, into the outlet 24 and on to the intake of the pump 26.

The free inner end of the boss portion 50 has a support member 58 attached thereto by means of a plurality of screws 60, which in turn are interconnected by a wire 62 to prevent the screws 60 from becoming loose and being drawn through the outlet 24 and into the pump 26 where the same can cause considerable damage. The support member 58 extends into and is supported by a circular member 58A which has its outer edge secured to the inner surface of the filter element 38. The support member 58 provides several functions, all of which will be described in greater detail hereinafter.

The bypass valve mechanism 54 is carried within the confines of the boss portion 50 and comprises a piston member 64 having a flange section 66 slidably engaging a tubular guide support 68. An O-ring seal 70 disposed in a recess about the outer periphery of the piston member 64 engages the interior surface of the boss portion 50 in a fluid sealing fashion to prevent fluid communication from opposite sides of the piston member 64, the piston member 64 separating the interior of the boss 50 into two chambers 72 and 74 respectively on the left and right sides of the piston member 64, as viewed in FIG. 1.

The tubular guide support 68 is fixed at its opposite ends respectively within a bore 76 formed in the cover 16 and a bore 78 extending through the support member 58. A spring 80, disposed within the chamber 72, has one end abutting one side of the piston member 64, while the other end is disposed in an annular recess 82 formed in the support member 58, the spring 80 normally biasing the piston member 64 toward the cap 16 and away from the support member 58.

The boss portion 50 is further provided at its upper end with a plurality of circumferentially spaced ports 84 which fluidly connect the chamber 74 with the annular chamber 44 and thus with the inlet port 20. The inner portion of the boss portion 50 is provided with another plurality of circumferentially spaced ports 86 which in turn fluidly connect the chamber 72 with the interior of the filter cartridge 34 and thus with the outlet 24. During normal operating conditions, the spring 80 biases the piston member 64 to a position within the boss portion 50 such that the fluid communication between the ports 84 and 86 is prevented.

As the walls of the filter element 38 begin to become clogged with accumulated dirt screened from the fluid passing radially therethrough causing the pressure differential between the inlet port 20 and outlet port 24 of the housing 10 to rise above a selected or predetermined permissible pressure differential as determined by the selected strength of the spring 80, the piston member 64 will move axially along the boss portion 50 to the left as viewed in FIG. 1, against the resistance of the spring 80 until the piston member 64 has moved along the interior of the boss portion 50 far enough to expose the ports 86 to the chamber 74 and thus to the incoming fluid within the annular chamber 44. This permits the fluid to bypass the filtering element 38 and flow directly from the inlet 20 through the annular chamber 44, the boss ports 84 and 86, directly into the interior of the filter cartridge 34, through the outlet 24 and on to the pump 26. Bypassing of the fluid is essential as a safety measure to prevent starvation of the system and the consequent damage to the component parts thereof.

When the filter element 38 of the filter cartridge 34 becomes dirty and clogged and bypassing occurs, the attendant should promptly clean or change the filter cartridge to restore the system to normal operation. This is accomplished by shutting down the hydraulic system, removing the screws holding the cap 16 to the housing 12 and axially removing the dirty filter cartridge 34 from the filter housing 12 and replacing it with a clean filter cartridge.

Figure 2:
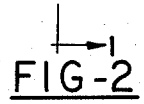
FIG. 2 is a plane view of the fluid filtering device as seen from the right end of FIG. 1.

The indicating means 56 are provided exteriorly of the housing 10 for indicating to the attendant the position of the piston member 64 within the boss portion 50 and thus the precise condition of the filter element 38. The axial movement of the piston member 64 of the bypass valve mechanism 54 is visibly indicated by the indicator means 56 carried by the top of the cover 16. A slotted arm member 98, carried at the upper end of the piston flange 66, engages an actuator member 100 which is supported for rotation by a pin 102. The actuator member 100 comprises an elongated flat strip having a uniform longitudinal twist so that linear axial movement of the arm member 98 rotates the pin 102. The pin 102 is supported for rotation in the cover 16 with its upper end extending above the upper surface of a cover 16 to support a pointer member 106 (FIG. 2). A seal member 108 provides a fluid tight seal between the pin 102 and the cover 16. A plate 110 (FIG. 2) mounted at the top of the cover 16 is provided with suitable indicia 112 to provide the attendant with a visual indication of whether or not the filter element 38 is clean, requires cleaning or replacing, or whether the fluid is actually bypassing the filter element 38.

A plurality of magnets 114 are carried on a rod 116 and are retained thereon by means of a nut 118. The magnets 114 are positioned interiorly of the filter element 38 and are adapted to attract any metallic particles contained in the fluid and which are small enough to pass through the filter element 38. The rod 116 has a threaded end 120 which engages a threaded section formed on the end portion of bore 78 within the support member 58. A circular air vent screen 124 is also retained on the rod 116 between the nut 118 and the underside of the magnets 114 for a purpose which will be described in greater detail hereinafter.

Under the various conditions of operation of the system employing the filter element 38 as hereinbefore described, air may very well collect and be trapped in the uppermost portion of the annular chamber 44 and generally in the area indicated by the arrow 128. Whenever this occurs, irrespective of the reason for the occurrence, there is the danger that the entire air mass forming the air pocket will be forcibly discharged through the filter element 38 and on to the inlet of the pump 26 with the shock of the air "slug" on the pump parts inflicting damage thereto and to the other parts of the system.

To overcome the aforementioned difficulty and possible damage to the system components, the present invention includes an air bleed means 130 for bleeding in small increments the entrapped air from the pocket 128. The air bleed means 130 includes passageways contained within the cover 16 which lead directly to the interior of the filter cartridge 34 where the suction of the pump 26 can effectively draw the entrapped air out of the filter housing 10 along with the filter fluid and thus permit the housing 10 to become completely filled with fluid.

Figure 3:
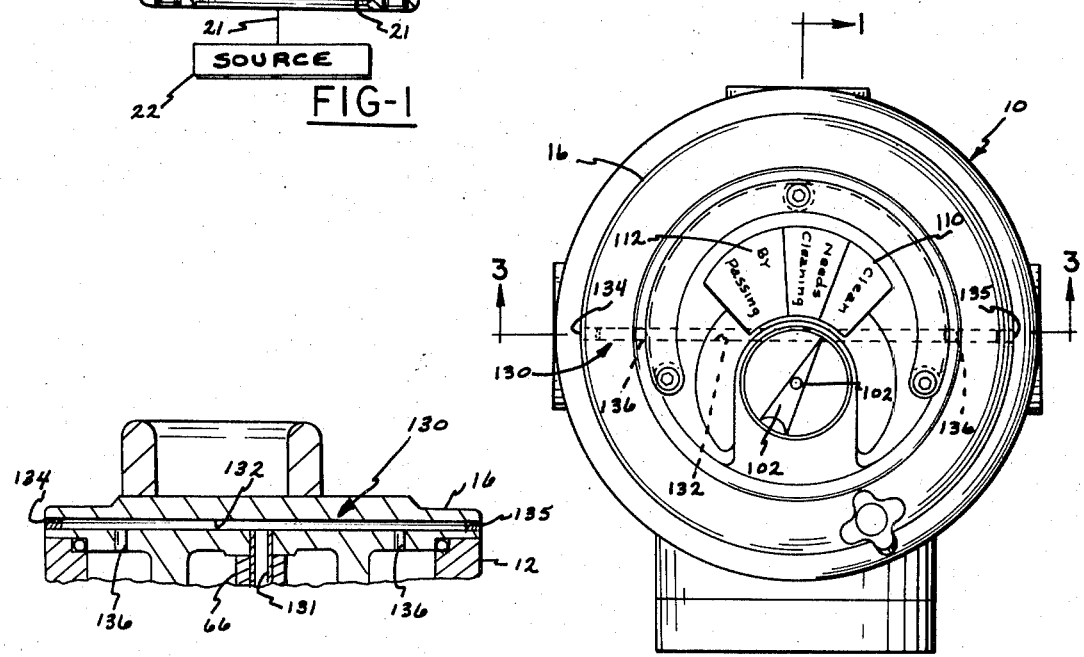
FIG. 3 is a fragmentary cross-sectional view of the fluid filtering device and taken substantially along line 3—3 of FIG. 2.

To accomplish this, an air bleed passageway 131 (FIGS. 1 and 3) extends through the tubular guide support member 68, the support member 58, and the magnet rod support 116, with the air bleed passageway 131 terminating at the cylindrical air vent screen 124. The cylindrical air vent screen 124 provides a means to prevent coarse particles of foreign matter from entering the interior of the filter cartridge 34. The opposite end of the air bleed passageway 131 terminates within the cover 16 and connects to a radially disposed passageway 132 drilled in the cover 16 at right angles to the axis of the bleed passageway 131, the opposite ends of the passageway 132 being plugged at 134 and 135. The passageway 132, in turn, communicates with the upper portion of the annular chamber 44 by means of a pair of axially disposed passageways 136.

The actual diameter of interconnecting passageways forming the air bleed system from the annular chamber 44 to the interior of the filter cartridge 34 is somewhat exaggerated in the drawings for purpose of illustration, however, in actual practice it has been found that a diameter size of approximately one-eighth of an inch will be adequate for a suction-type filter handling from 75–150 gallons per minute.

It should be noted that the support member 58 carried at the innermost end of the boss portion 50 provides several functions including: providing a backing for the spring 80; forming a support for one end of the tubular guide member 68; providing a portion of the path of the air bleed means 130; and further providing a means for mounting the magnets 114.

In addition, it should be noted that the indicating means 56 and the bypass valve mechanism 54 are mounted to the cover 16 in such a manner that the same are enclosed by the boss portion 50 and fully protected thereby, thus they are less likely to be interfered with when the cover 16 is removed to permit replacement or cleaning of the filter element 38.

It should also be noted that since the piston member 64 is not connected to the filter element and not movable therewith as described hereinbefore in the description of some of the previously used filtering devices, the piston member 64 is more sensitive to the pressure differential between the inlet and the outlet ports of the fluid filter device 10, and thus it is more apt to function in a satisfactory manner during actual use.

Although we have described but one embodiment of the present invention it is apparent that many modifications and changes may be made without departing from the spirit of the invention or the scope of the appended claims.

What is claimed is as follows:
1. A device for filtering fluid comprising:
   a housing defining a cavity and having an inlet port and an outlet port communicating with said cavity, said housing further having an open end,
   an elongated filter element carried in said cavity and disposed intermediate said inlet port and said outlet port to normally filter fluid passing through said housing;

a cover member secured to said housing and closing said open end, said cover member having a hollow boss extending inwardly therefrom into said cavity;

an elongated guide member rigidly attached to said cover and extending through the interior of said boss and into the interior of said filter element, a first support member carried by said cover and supporting the inner end of said guide member at a point spaced inwardly of said cover member, a second support member carried by said filter element and supporting said first support member, a pressure responsive piston member slidably mounted on said elongated guide member and dividing the interior of said boss into two chambers, one of which is in communication with said inlet port and the other of which is in fluid communication with said outlet port, said piston member normally preventing fluid communication between said inlet port and said outlet port and being responsive to a predetermined pressure differential between the two chambers to slidably move along the guide member to a position wherein said inlet port is connected directly with said outlet port whereby said filter element is bypassed;

an air bleed means for bleeding air from the inlet side of said filter element to the outlet side of said filter element, said means comprising a path from the inlet side of said filter element and passages through said guide member and through said first support member to a point within said filter element and spaced inwardly of said cover;

means normally biasing said piston member toward a position in which fluid communication between said inlet and said outlet ports is prevented, said biasing means comprising a spring disposed between said piston member and said first support member; and magnet means mounted to said first support member and extending into said filter element.

2. The device as defined in claim 1 and including means carried by said cover member and operatively connected with said piston member to indicate exteriorly of said cover member the position of said piston member to thereby indicate the condition of said filter element.

\* \* \* \* \*

UNITED STATES PATENT OFFICE
CERTIFICATE OF CORRECTION

Patent No. 3,701,424  Dated October 31, 1972

Inventor(s) Carl A. Brown and Jerald F. Thomas

It is certified that error appears in the above-identified patent and that said Letters Patent are hereby corrected as shown below:

Column 3, line 29, "36" should be --136--.

Column 4, line 2, "36" should be --136--.

Column 6, line 63, after "housing", delete "further".

Signed and sealed this 1st day of May 1973..

(SEAL)
Attest:

EDWARD M. FLETCHER, JR.　　ROBERT GOTTSCHALK
Attesting Officer　　　　　　Commissioner of Patents